United States Patent [19]

Theurer

[11] 4,272,664

[45] Jun. 9, 1981

[54] MOBILE RAIL WELDING MACHINE

[75] Inventor: Josef Theurer, Vienna, Austria

[73] Assignee: Franz Plasser Bahnbaumaschinen-Industriegesellschaft m.b.H., Vienna, Austria

[21] Appl. No.: 957,402

[22] Filed: Nov. 3, 1978

[30] Foreign Application Priority Data

Dec. 28, 1977 [AT] Austria ................................. 9352/77

[51] Int. Cl.³ ..................... E01B 11/50; E01B 31/18; B23K 11/04
[52] U.S. Cl. ........................................ 219/53; 219/97; 104/15
[58] Field of Search ................ 219/53, 54, 55, 97, 219/100, 124.31; 104/2, 15; 51/178

[56] References Cited

U.S. PATENT DOCUMENTS

| | | | |
|---|---|---|---|
| 2,124,869 | 7/1938 | Drain, Jr. | 219/97 X |
| 2,197,729 | 4/1940 | Miller | 51/178 |
| 2,250,869 | 7/1941 | Jones et al. | 104/15 X |
| 3,366,075 | 1/1968 | Clayborne et al. | 104/15 |
| 3,823,455 | 7/1974 | McIlrath et al. | 29/33 R |
| 4,050,196 | 9/1977 | Theurer | 51/178 |

FOREIGN PATENT DOCUMENTS

| | | | |
|---|---|---|---|
| 459280 | 9/1968 | Switzerland. | |
| 1235164 | 6/1971 | United Kingdom | 104/15 |
| 2011511 | 7/1976 | United Kingdom | 104/15 |

OTHER PUBLICATIONS

Plasser, Theurer Information Prospectus Titled "Self Propelled Flash-Butt Welding Machine K-355 PT", Bulletin H7.
Railway Gazette International, Oct. 1977, pp. 388-391, "Flash-Butt Welding Using Mobile On-Track Machine", by Dr. Techn K. Riessberger.

Primary Examiner—B. A. Reynolds
Assistant Examiner—Keith E. George
Attorney, Agent, or Firm—Kurt Kelman

[57] ABSTRACT

A mobile rail welding machine comprises a frame, two undercarriages supporting the frame, a hydraulically driven flash butt welding unit for welding abutting rail section ends of a track rail mounted on the frame intermediate the undercarriages, a hydraulically driven weld burr removal unit mounted on the frame intermediate the undercarriages, which units may be integrated with each other, and a hydraulic jack for the frame operable to relieve the track rails of the machine weight.

10 Claims, 5 Drawing Figures

U.S. Patent  Jun. 9, 1981  4,272,664
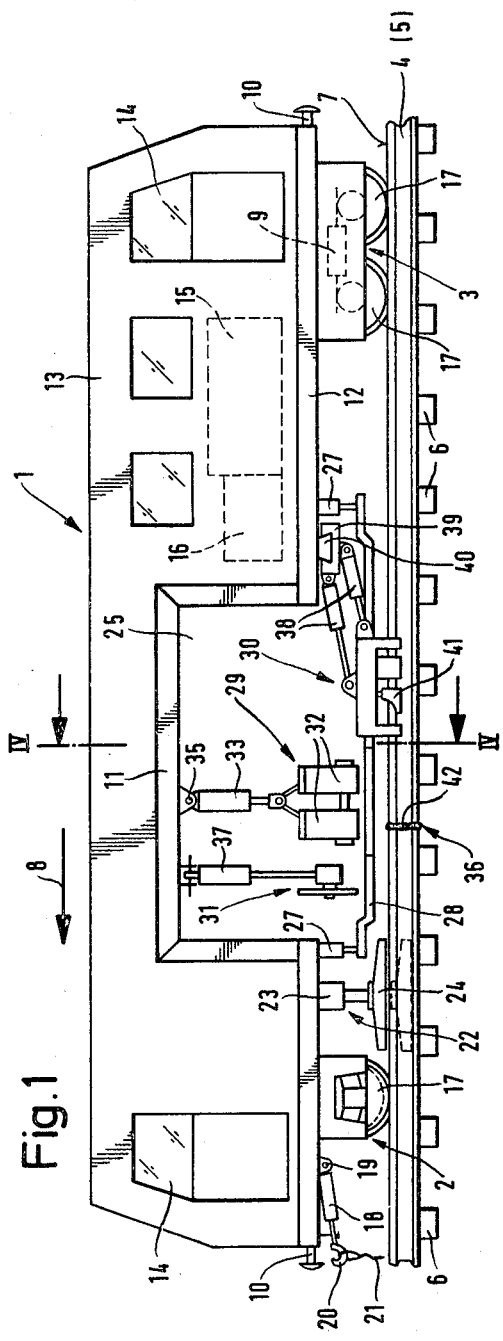
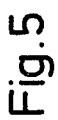
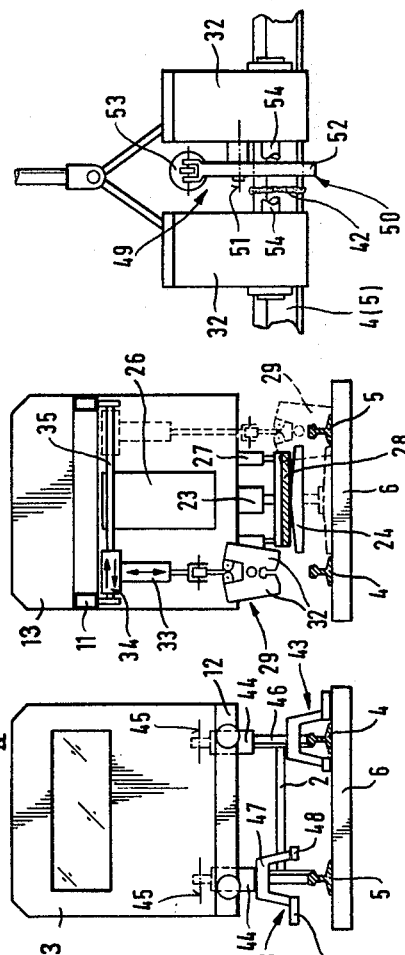
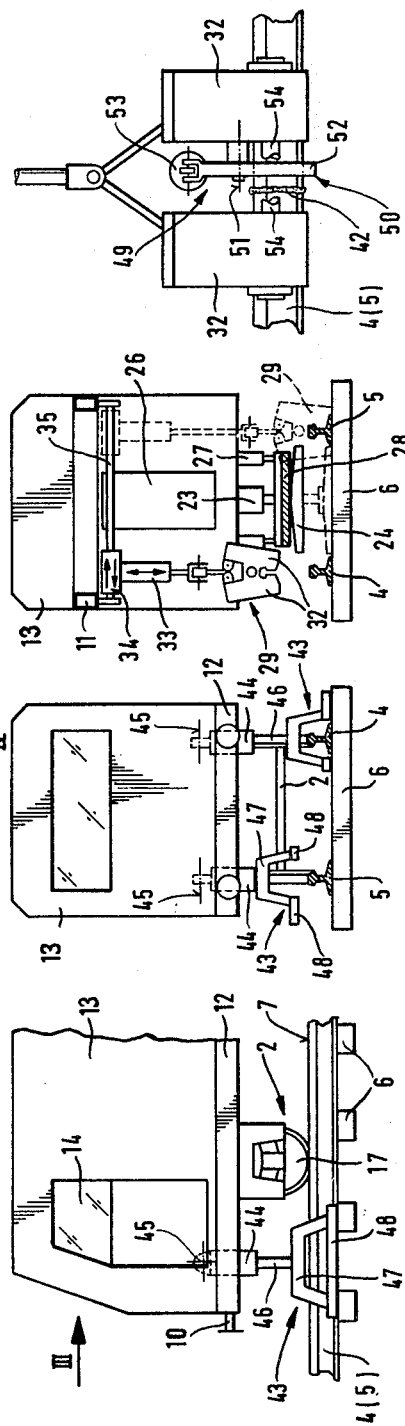

MOBILE RAIL WELDING MACHINE

The present invention relates to improvements in a mobile rail welding machine mounted on a track for mobility in an operating direction, the track being comprised of rails consisting of rail sections having abutting ends and ties supporting the rail sections.

Known welding machines for welding the abutting rail section ends of a selected one of the rails comprise a frame, a hydraulically driven flash butt welding device and a hydraulically driven weld burr removal device. These machines have proven to be highly efficient in track welding operations, produce butt welds of high quality and are relatively simple to operate. The machines carry a flash butt welding unit mounted on a boom projecting from the front end of the machine and vertically adjustable as well as transversely pivotal to enable the welding unit to operate on the right or left rail. This known type of welding machine is self-propelled and carries all power sources and controls necessary for the welding and weld burr removal operations. The boom is retractable so that the welding unit may be protected within the covered and closed machine frame when the machine is moved between working sites so as to be exposed to damage or inclement weather. The machine is capable not only of moving under its own power but also of being coupled to a working train for transportation between working sites. When the machine is in operation, particularly where the right-of-way has two adjacent tracks, special safety measures must be taken to protect the operating crew. The adjustment of the welding unit as well as the weld burr removal unit must be effected manually and observed by operators placed close to the selected rail and these operators are exposed to danger and possible injury by trains passing on the adjacent track, particularly in the darkness or under poor conditions of visibility.

It is the primary object of this invention to provide a mobile rail welding machine of the indicated type which, while simple in structure, increased the efficiency of operation and avoids the shortcomings of the known machines.

This object is accomplished in accordance with the invention by supporting the machine frame on two undercarriages spaced from each other along the track, mounting the flash butt welding and weld burr removal devices on the frame intermediate the undercarriages, and providing a support means for the frame operable to relieve the track rails of the machine weight, the support means being preferably arranged in the region of the front end of the frame.

This combination for the first time provides a mobile flash butt rail welding machine capable of very economically using this proven welding technique without danger to the operating personnel and with full control of all operations from the machine frame, without the need for operators to move along the track. The mounting of the welding and weld burr removal devices between the undercarriages enables an operator readily to view these devices from the interior of the machine frame or chassis, the devices are readily accessible at all times and operable without endangering the operating crew, and they are always protected against weather and damage. This increases the useful life of the machine and makes it possible to use it under all types of weather conditions, including rain, as long as the rail temperature is within the required range for welding, without incurring the danger of shorts between the various electrically-charged welding device components. The support means makes it possible to relieve the section of the track rail ahead of the abutting rail section ends to be welded together so that the front undercarriage will not press down on this rail section, thus readily enabling this rail section to follow the longitudinal movements imposed on it by the pairs of jaws of the flash butt welding device, these movements being opposed only by the frictional resistance between rail and ties produced by the weight of the rail section. Therefore, the conventional hydraulically driven flash butt welding devices may be used on the improved machines without the need to increase the power of the drives.

Furthermore, the overall structure of the machine is greatly simplified, disposing of the retractable boom selectively positioning the welding device in respective operating and rest positions. Mounting the welding device permanently between the two undercarriages improves the visibility from the operator's cab.

In operation, too, the machine is much improved. Considerable time is saved in placing the machine in operation since the welding device merely needs to be lowered at the welding site and engaged with the abutting rail section ends to be welded together. Additional time is saved because all the auxiliary devices are mounted adjacent the welding device in the interior of the machine frame. This greatly increase the work progress and decreases dead track times during which no trains can pass. Even a reduction of the operating crew may be obtained.

The above and other objects, advantages and features of the present invention will become more apparent from the following detailed description of certain now preferred embodiments thereof, taken in conjunction with the accompanying somewhat schematic drawing wherein FIG. 1 is a side elevational view of one embodiment of a mobile welding machine according to this invention;

FIG. 2 is a partial side elevational view of such a machine incorporating another embodiment of the support means;

FIG. 3 is a front end view of the machine of FIG. 2 in the direction of arrow III;

FIG. 4 is a cross sectional view along line IV—IV of FIG. 1; and

FIG. 5 is an enlarged view of another embodiment of the weld burr removal device incorporated into the machine.

Referring now to the drawing and first to FIGS. 1 and 4, there is shown a mobile welding machine 1 comprising frame 12 and two undercarriages 2 and 3 spaced from each other along track 7 and supporting the frame thereon. The track is comprised of rails 4 and 5 consisting of rail sections having abutting ends (see rail joint 36) and ties 6 supporting the rail sections. The welding machine is mounted on track 7 for mobility in an operating direction indicated by arrow 8 and, in the illustrated embodiment, front undercarriage 2, as seen in the operating direction, is a freely driven single-axle truck while rear undercarriage 3 is a double-axle truck and includes drive 9 for driving the wheels of this undercarriage, thus making the machine self-propelled.

The closed machine housing or chassis 13 is constructed more or less like that of a regular railroad car and is mounted on frame 12 which has couplings 10 at both ends to enable the machine to be incorporated into a train, if desired, the machine chassis including operator's cabs 14 at its respective ends. The machine frame has a recessed portion 11 intermediate the undercarriages and somewhat closer to the front than to the rear end of the machine, protected space 25 defined by intermediate frame portion 11 serving to house the operating devices of the welding machine. Power plant 16 and drive motor 15 of the machine, which is connected to drive 9, are housed in the rear and longer portion of chassis 13, the power plant including an electrical current generator for supplying power to the welding device as well as the required pressure fluid source or sources for hydraulically and possibly pneumatically operated devices used in the machine. The major portion of the machine weight, therefore, rests on double-axis rear truck 3. Since front truck 2 has only a single axle, each set of wheels 17 carries about the same weight.

In the region of front undercarriage 2 and above each track rail 4 and 5, a hydraulic jack 18 is mounted on machine frame 12 for pivoting about a pivot 19 extending transversely of the machine. The free end of the piston rod of jack 18 carries a hook 20 for holding one end of a cable 21 whose other end may be affixed to the respective rail for a purpose and in a manner to be explained hereinafter. Instead of using a cable, another suitable elongated tensile element may be used, such as a chain, a pull rod or the like.

Welding machine 1 comprises support means 22 for the machine frame to relieve the track rails of the machine weight. As shown in the illustrated embodiments, the support means is arranged in the region of the front end of frame 12 in the operating direction and is constituted by a hydraulic jack means. In the embodiment of FIGS. 1 and 4, the hydraulic jack means is a hydraulic jacking unit 23 mounted adjacent and rearwardly of front undercarriage 2 and substantially centered between the track rails, as clearly illustrated in FIG. 4. This unit comprises a centered hydraulic cylinder projecting downwardly from frame 12 and shoe 24 attached to the free end of the piston rod extending from the hydraulic cylinder. As can be seen from FIG. 1, the extension of support shoe 24 is larger than a crib width so that the shoe can engage two successive ties 6 when operated, thus assuring a more secure support for the machine during the welding operation. FIGS. 1 and 4 illustrate support shoe 24 in full lines in its rest position in which it remains during the advancement of machine 1 along the track and, in broken lines, in its lowered support position. In the latter position, wheels 17 of front truck 2 are lifted off the rails, as shown in broken lines in FIG. 1, thus relieving the rails of the machine weight in the forward range of the machine where the welding operation takes place.

Since power plant 16 includes a source of hydraulic operating fluid, a hydraulic jack means provides a particularly useful and simple support means for the frame, making it possible rapidly to lift the frame off the rails to enable the forward rail sections to move freely towards the rail joint 36 so as to make an effective flash butt welding operation possible. Since the lifting movement is effected substantially in a vertical direction and machine frame 12 needs to be raised only sufficiently to move the running surface of wheels 17 off the rails without moving the wheel flanges out of engagement with the rail heads, there will be no danger of causing derailments when the machine is lowered again after completion of the welding operation.

Centering the hydraulic support jack between the track rails and, preferably, dimensioning it so that it engages two adjacent ties produces a particularly simple and sturdy support structure which takes up a minimum of space in an area not otherwise occupied by any operating devices.

Another embodiment of a hydraulic jack support means is shown in FIGS. 2 and 3. Hydraulic jack means 43 comprises a pair of hydraulic jacks 44 associated with a respective one of rails 4 and 5, and each jack includes a hydraulic cylinder pivotally mounted on pivots 45 extending transversely of the machine, the outer free end of piston rod 46 of the jacks carrying yoke-shaped support shoe 47. Support strips 48 are affixed to the ends of each leg of the yoke-shaped support shoe and are long enough, as shown in FIG. 2, to span a crib and engage successive ties 6 when the jacks are operated. As illustrated in FIG. 3, the jack associated with each rail can be operated independently, the left jack being shown in its raised rest position while the right jack associated with rail 4 is in its lowered operative position. This gives the possibility of lifting the machine off only one of the rails when welding is effected only on the one rail.

This embodiment provides a very stable support for the machine when it is lifted off the track and also makes it possible to lift only at one rail because of the play afforded by the spring support between the undercarriage and the frame, and the slight elastic deformability of the frame itself.

Recessed frame portion 11 of machine frame 12 defines protected operating space 25 of the machine between the undercarriages and is accessible from the interior of chassis 13 through door 26 (see FIG. 4). A vertically movable working platform 28 forms the floor of the operating space and can be lowered and raised by means of hydraulic jacks 27 which mount the platform on the machine frame. Hydraulically driven flash butt welding device 29 for welding the abutting rail section ends of a selected one of the rails, hydraulically driven weld burr removal device 30 and rail grinding machine 31 are mounted on the machine frame in operating space 25 intermediate undercarriages 2 and 3. If desired, other auxiliary tools used in the operations may also be arranged in this space.

The flash butt welding device comprises a pair of welding jaws 32 containing the required welding apparatus and is suspended for free pendulum movement from the free end of the piston rod of hydraulic jack 33 to enable the welding device to be raised and lowered. The jack is affixed to guide sleeve 34 which is reciprocably mounted on transverse guide bar 35 mounted on the machine frame for moving the welding device from one rail to the other. If desired, the transverse guide bar may itself be displaceable in a longitudinal direction to enable welding device 29 to be centered properly with respect to rail joint 36. At the left side of FIG. 4, the welding device is shown in full lines in its raised rest position above rail 4 while it is shown in broken lines in the lowered operating position in engagement with rail 5, welding jaws 32 engaging the rail for welding the abutting rail section ends together.

For the sake of clarity, rail grinding machine 31 has been shown only in FIG. 1. This machine is suspended from the machine frame by jack 37 F or free pendulum movement, similar to the suspension of the welding device. In case rail joint 36 would fall in the range of a tie 6, the rearward rail section whose other end has previously been welded at a preceding joint can thus be ground down at the joint sufficiently to shorten this rail section so that the rail joint is displaced into the range of the adjacent crib.

The flash butt welding of the abutting rail section ends at joint 36 will produce a weld burr or bead 42 which must be removed to produce smooth-surfaced rails. This removal is effected by weld burr removal device 30 which is hydraulically driven by a pair of guides constituted by hydraulic jacks 38 extending in the longitudinal direction of the machine and linked to slide 39 which is guided for transverse reciprocation from one rail to the other on guide bar 40 of dove-tailed cross section. Weld burr removal device 30 has cutter head 41 shaped to engage at least the head of the rail to cut away burr 42 when hydraulic jacks 38 are operated to move the cutter head along the engaged rail.

In this arrangement, the weld burr removal device is associated directly with the flash butt welding device and becomes an integral part of the welding machine. The weld burr removal device need not be positioned manually for operation and clamped to the rail but is driven hydraulically for engagement with the rail. The braked undercarriage of the mobile machine absorbs the reaction forces from the removal device as it is driven along the rail to remove the weld burr. This relieves the operating personnel of the work involved in the manual operation of a burr cutting device and also makes it possible to operate the device on the still red-glowing weld burr as soon as the welding device has been lifted off the rail joint. This prevents undue cooling of the burr before it is removed and thus considerably reduces the forces required therefor.

The operation of the welding machine will be obvious from the above description of the structure, in conjunction with the following explantion:

Drive 9 is engaged and machine 1 is driven in the direction of arrow 8 close to rail joint 36 to be welded and the machine is stopped before front undercarriage 2 has reached the joint. Wire rope 21 is now attached to hook 20 of jack 18 associated with a respective one of the rails comprising the two rail sections whose abutting ends are to be welded together, and the other end of the wire rope is suitably clamped to a forward portion of the rail section ahead of front undercarriage 2. The rail fastening elements are previously removed from this rail section so that it rests freely on the ties and jack 18 is operated to pull the rail section to within about 1 cm of the abutting end of the adjoining rail section on which machine 1 stands, thus forming rail joint 36 which is to be welded. The machine is then driven on in operating direction 8 until rail joint 36 comes to lie in the range below flash butt welding unit 29. Jack 23 is now operated to lower support shoe 24 and lift machine 1 sufficiently to disengage the wheels of undercarriage 2 from the rails. Jack 33 is then operated to lower unit 29 until rail joint 36 is disposed between the pair of welding jaws 32. These welding jaws grip the abutting rail section ends and accurately align the same. A suitable welding voltage, for example 6 volts, is then applied and the butt welding operating proceeds in the conventional manner. In the last phase of welding, the two welding jaws are strongly pressed together to unitize the two abutting rail section ends in a welded joint. Excessive material bulges outwardly to form weld burr or bead 42 around the circumference of joint 36 and the rail section is shortened by about two to three centimeters. Since the forwardly projecting portion of the rail section is free of any pressure or weight of undercarriage 2, the longitudinal movement of the rail section during the final phase of the welding operation can proceed unhindered and the drive of welding unit 29, which causes the relative movement of the two welding jaws, need only be of sufficient power to overcome the frictional forces due to the proper weight of the rail.

After welding has been completed, the welding unit is disengaged and immediately raised, and machine 1 is driven forward in the operating direction so that the still red-glowing burr 42 is positioned in the range of burr removal unit 30. The machine is then braked again and jack 38 is operated to drive unit 30 over the burr to remove the same.

If a rail joint is to be welded in the opposite rail, welding unit 29 is displaced along guide 35 immediately after it has been lifted and welding proceeds at the other rail in the same manner.

After the welding operations have been completed, support shoe 24 is raised to re-engage wheels 17 of undercarriage 2 with the rails to enable machine 1 to be moved to the next welding site.

The embodiment of FIGS. 2 and 3 operates in the same manner, except that only one of the supports needs to be actuated if welding proceeds along a single rail.

According to the embodiment of FIG. 5, the hydraulically driven welding and weld burr removal devices constitute a structural unit, the removal device being built into the welding device. This produces a particularly simple and very space-saving construction, further simplifying the operation of the machine. With such a structural unit, positioning of the welding unit with respect to the rail joint simultaneously places the weld burr removal device in the proper position with respect to the weld burr being produced.

In the illustrated embodiment, cutting head 50 of weld burr removal device 49 is arranged in the space intermediate welding jaws 32 and consists of two cutting jaws 52 arranged symmetrically with respect to a vertical plane extending through the rail, each cutting jaw being pivotal about axle 51 extending in the direction of the rail. The two cutting edges of the cutting jaws together form a counter-profile to the profile of the rail. The upper ends of the cutting jaws are linked together by a horizontal pressure fluid cylinder-and-piston unit 53 for pivoting and cutting jaws about pivots 51. Immediately after welding has been completed, burr removal device 49 is brought into its operating position by actuating unit 53 and thus pressing cutting jaws 52 from both sides against the rail. The clamping force of the welding jaws 32 which carry the cutting head (on the right in FIG. 5) is then released while the other welding jaws 32 (left in FIG. 5) remain clamped to the rail. The hydraulic drive (of which only piston rod 54 can be seen in FIG. 5) of welding unit 29 is then operated to displace the welding jaws 32 carrying cutting head 50 longitudinally towards the welding jaws clamped to the rail. This causes the cutting edges of the cutting head to engage weld burr 42 and to remove the same in a single pass. In this way, the machine is not further advanced between welding and burr removal so that the burr is removed immediately after welding while it is still in plastic condition.

Obviously, various modifications and changes in the various structures exemplified herein may occur to those skilled in the art without departing from the spirit and scope of the present invention. For instance, machine supports may be arranged near both ends of the machine so that the same may be operated in both directions. In whatever modification, the machine is readily placed in operation, very simple to operate and exceedingly efficient. Since working space 25 is accessible from the interior of the chassis, all operations can be performed without leaving the machine, thus avoiding any danger to the operating personnel from passing trains.

What is claimed is:

1. A mobile rail welding machine mounted on a track for mobility in an operating direction, the track being comprised of rails consisting of rail sections having abutting ends and ties supporting the rail sections, which comprises the combination of
   (a) a heavy frame supporting a chassis capable of housing operating personnel,
   (b) two undercarriages spaced from each other along the track and supporting the frame thereon, the frame defining an upwardly recessed operating space intermediate the undercarriages,
   (c) a hydraulically driven flash butt welding device for welding the abutting rail section ends of a selected one of the rails, the welding device being mounted on the frame in the operating space intermediate the undercarriages,
   (d) a hydraulically driven weld burr removal device mounted on the frame and extending into the operating space intermediate the undercarriages, and
   (e) a support means for the frame operable to relieve the track rails of the machine weight.

2. The mobile rail welding machine of claim 1, wherein the support means is arranged in the region of the front end of the frame in the operating direction.

3. The mobile rail welding machine of claim 1 or 2, wherein the support means is a hydraulic jack means.

4. The mobile rail welding machine of claim 3, wherein the hydraulic jack means comprises a pair of pivotally mounted hydraulic jacks, each of the jacks being associated with a respective one of the track rails, and each of the jacks including a yoke-shaped support shoe engageable with adjacent ones of the track rails.

5. The mobile rail welding machine of claim 3, wherein the hydraulic jack means is mounted in the region of the front of the frame in the operating direction and substantially centered between the track rails.

6. The mobile rail welding machine of claim 5, wherein the hydraulic jack comprises a support engageable with adjacent ones of the track ties.

7. The mobile rail welding machine of claim 1 or 2, wherein the hydraulically driven weld burr removal device comprises hydraulic jack means operable to move the removal device in relation to the welding device in the direction of the track.

8. The mobile rail welding machine of claim 1 or 2, wherein the hydraulically driven welding and weld burr removal devices constitute a structural unit, the removal device being built into the welding device.

9. The mobile rail welding machine of claim 1 or 2, further comprising guide means for displacing the flash butt welding device and the weld burr removal device transversely in relation to the frame.

10. The mobile rail welding machine of claim 9, wherein the guide means for transversely displacing the flash butt welding device is displaceable in a longitudinal direction.

* * * * *